US012330562B1

(12) United States Patent
Gowda et al.

(10) Patent No.: US 12,330,562 B1
(45) Date of Patent: Jun. 17, 2025

(54) DYNAMIC CAMERA IMAGE PRESENTATION IN A VEHICLE

(71) Applicant: Amazon Technologies, Inc., Seattle, WA (US)

(72) Inventors: Nikhil Manjunath Gowda, San Francisco, CA (US); Ching Pin Jackie Chang, Santa Clara, CA (US); Tirthankar Sengupta, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 233 days.

(21) Appl. No.: 17/853,538

(22) Filed: Jun. 29, 2022

(51) Int. Cl.
*B60R 1/26* (2022.01)
*B60K 35/00* (2024.01)
*B60K 35/28* (2024.01)
*B60K 35/29* (2024.01)
*H04N 23/69* (2023.01)

(52) U.S. Cl.
CPC .............. B60R 1/26 (2022.01); B60K 35/00 (2013.01); H04N 23/69 (2023.01); *B60K 35/28* (2024.01); *B60K 35/29* (2024.01); *B60K 2360/176* (2024.01); *B60K 2360/1868* (2024.01); *B60R 2300/105* (2013.01); *B60R 2300/303* (2013.01); *B60R 2300/306* (2013.01); *B60R 2300/408* (2013.01); *B60R 2300/802* (2013.01)

(58) Field of Classification Search
None
See application file for complete search history.

(56) References Cited

U.S. PATENT DOCUMENTS

| | | | |
|---|---|---|---|
| 9,760,092 B2 | 9/2017 | Ferguson et al. | |
| 10,495,493 B2 | 12/2019 | Reed et al. | |
| 2006/0125919 A1* | 6/2006 | Camilleri | H04N 7/188 348/148 |
| 2017/0039782 A1* | 2/2017 | Moeller | G07C 5/008 |
| 2017/0259743 A1* | 9/2017 | Uchimura | G06V 20/56 |
| 2019/0075253 A1* | 3/2019 | Wada | H04N 23/63 |
| 2021/0048825 A1 | 2/2021 | Elvitigala et al. | |
| 2021/0053489 A1* | 2/2021 | Golov | H04N 23/57 |
| 2021/0188177 A1* | 6/2021 | Egashira | B60R 1/26 |
| 2022/0258670 A1* | 8/2022 | Hanchett | B60R 1/28 |

* cited by examiner

*Primary Examiner* — Rebecca A Volentine
(74) *Attorney, Agent, or Firm* — Kilpatrick Townsend & Stockton LLP

(57) ABSTRACT

Dynamic camera image presentation in a vehicle is described herein. In an example, a computer system presents, on a display of a vehicle, first image data generated by a camera of the vehicle. The first image data is based at least in part on a first presentation property. The computer system determines a trigger to change the first presentation property and a second presentation property associated with a type of the trigger. The computer system presents, on the display, second image data generated by the camera. The second image data is presented based at least in part on the second presentation property.

20 Claims, 10 Drawing Sheets

DYNAMIC CAMERA IMAGE PRESENTATION IN A VEHICLE

BACKGROUND

Many modern vehicles are equipped with cameras and other sensors for assisting drivers with various operations associated with driving the vehicles. In addition, vehicles often include displays for presenting various information to the drivers. For instance, a display may present a map of a location of a vehicle, content information about music or other content being played within the vehicle, and/or other data related to the operation of the vehicle.

BRIEF DESCRIPTION OF THE DRAWINGS

Various embodiments in accordance with the present disclosure will be described with reference to the drawings, in which.

DETAILED DESCRIPTION

Figure 1:
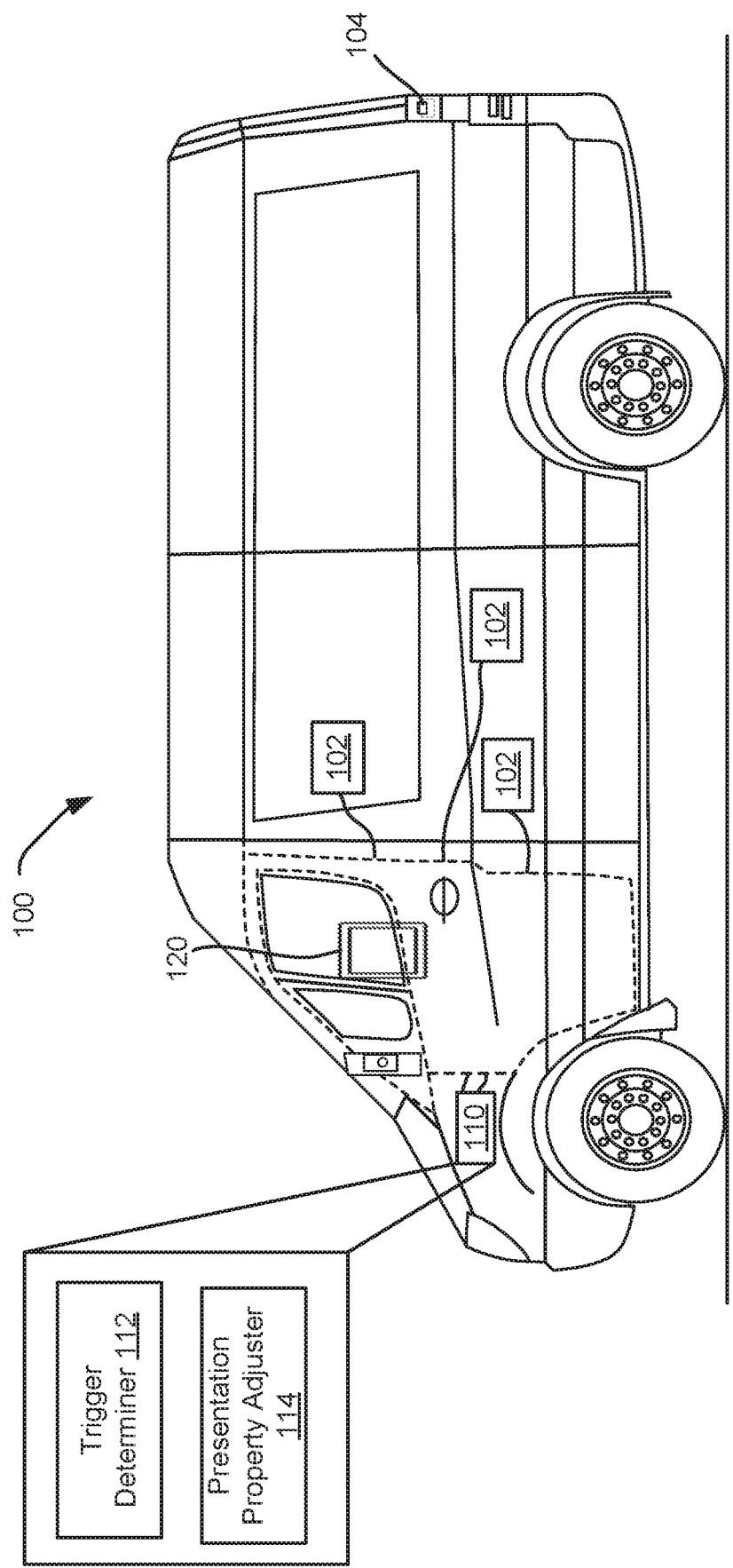
FIG. 1 illustrates an overall context of dynamic camera image presentation in a vehicle, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, dynamic camera image presentation in a vehicle. A vehicle can include a camera, such as a rear-view camera (or a side-view camera, a front-view camera, or a set of such cameras) and a display for presenting image data from the camera. A computer system may also be installed in the vehicle or may be at a location remote from the vehicle. In both cases, the computer system is configured to process the image data for presentation on the display in accordance with a presentation property. The computer system presents, on the display of the vehicle, first image data generated by the camera of the vehicle. The first image data can be presented in a container of a user interface on the display and can be based on a first presentation property, which may be a size of the container or a setting of the camera (e.g., a digital zoom, an optical zoom, a camera tilt, a camera panning, a camera brightness, a camera ISO, a camera contrast, night mode, etc.). The computer system determines a trigger to change the first presentation property. The trigger may be associated with a user input, a vehicle activity, a workflow activity, an object activity, and/or environmental conditions surrounding the vehicle. Based on a type of the trigger, the computer system determines a second presentation property associated with a type of the trigger. For example, the second presentation property may be a change to the size of the container or to the setting of the camera. The computer system presents, on the display, second image data generated by the camera. The second image data is presented based on the second presentation property.

To illustrate, consider a driver operating a vehicle in accordance with a workflow of delivering items. Various workflow activities of the item deliveries can be associated with different presentation properties for the image data. For example, as the vehicle approaches a stop location where the vehicle is to be parked for an item delivery, a computer system may present, at a display, image data generated by a camera of the vehicle using a first zoom setting as the presentation property. As the vehicle starts to perform a parking maneuver at the stop location, the computer system detects the parking maneuver as a trigger to change the first zoom setting. Based on a predefined association between the parking maneuver and a second presentation property indicating that a second zoom setting is to be used for the parking maneuver, the computer system presents the image data generated during the parking maneuver at the display using the second zoom setting.

Embodiments of the present disclosure provide several technical advantages over conventional camera image presentations in vehicles. For instance, the triggers and associated presentation properties can be customized for a vehicle, providing a better user experience and safer driving associated with the dynamic changing of the camera image presentation. In addition, the triggers and presentation properties can be associated with a particular workflow for which the vehicle is used. So, if the workflow involves item deliveries, the presentation properties can be defined such that the item deliveries are performed more optimally. The present disclosure also provides constraints for the presentation properties that take into account safety factors associated with the operation of the vehicle. Therefore, the dynamic changing of the presentation at the display can occur in a safer manner as compared to conventional systems.

In the interest of clarity of explanation, various embodiments of the present disclosure are described in connection with a rear-view camera, a display, and a computer system installed in a vehicle. However, the embodiments are not limited as such. For instance, the embodiments equivalently apply to any other types of cameras (e.g., side-view cameras and front-view cameras) and to a camera system that includes multiple cameras (e.g., a rear-view camera, a side-view camera, and a front view camera, with the capability of presenting image data from all three cameras on the same display (e.g., in different containers as separate image data feeds, or in a same container as a stitched image data feed) or on different displays). The embodiments equivalently apply to presenting image data (e.g., of a single camera or multiple cameras) on multiple displays, where the presentation can use a different presentation property on each display. Further, the embodiments equivalently apply to a computer system that may be remote from the vehicle and that may be processing image data of that vehicle only or of multiple vehicles. Such a computer system can be communicatively coupled with the vehicle (e.g., with vehicle systems that include a camera and a display).

FIG. 1 illustrates an overall context of dynamic camera image presentation in a vehicle 100, according to embodiments of the present disclosure. The vehicle 100 includes a control unit 110 in communication with vehicle systems over one more communication bus that include, for instance, a controller area network (CAN) bus. The vehicle system can include electronic control units (ECUs) 102, a rear-view camera 104, and a display 120 among other systems (e.g., an infotainment system). The display 120 can be part of the infotainment system or can be implemented as a smart rear-view mirror (or a smart side-view mirror) that provides a user interface in which image data can be presented. Although not shown in FIG. 1, the vehicle 100 may additionally include other cameras and sensors for gathering context data about the vehicle 100. Each ECU 102 may be an embedded system that controls and/or monitors one or more electrical systems or subsystems the vehicle 100. For instance, one of the ECUs 102 may control power windows, power mirrors, and air conditioning, another one of the ECUs 102 may control the brakes, another one of the ECUs 102 may control settings of the rear-view camera 104, one of the ECUs 102 may control display settings of the display 120, and so on. The control unit 110 is capable of supporting various computing services including, for instance, dynamic image presentation services. In particular, the control unit 110 can be implemented as a computer system that includes one or more processors, one or more memories storing computer-readable instructions for a dynamic image presentation service, one or more network interfaces, and/or other computing components for communication with the ECUs 102, the rear-view camera 104, and the display 120.

In an example, the control unit 110 includes a trigger determiner 112 and a presentation property adjuster 114. As a driver operates the vehicle 100, the trigger determiner 112 can determine when a trigger occurs that is associated with changing a presentation property of the display 120 (or, similarly, a first presentation property to be used in the presentation of image data on the display 120). For instance, the display 120 includes a container for showing image data generated by the rear-view camera 104. The image data that is presented has a first presentation property, which may be a size of the container or a setting of the rear-view camera. Upon detecting a trigger, the trigger determiner 112 can determine a type of the trigger. For example, the type of the trigger may be a user input (e.g., manual manipulation, voice command, button on the steering wheel, etc.), a vehicle activity (e.g., turn signal, speed, lane change detection, vehicle use, etc.), a workflow activity associated with using the vehicle 100 for item deliveries (e.g., arriving to a stop location associated with an item delivery, conducting a parking maneuver associated with the stop location, the vehicle 100 being parked in association with the item delivery, departing from the stop location, etc.), an object activity (e.g., a change in in proximity of an object to the vehicle 100), environmental conditions (e.g., time of day, weather conditions, etc.), a vehicle use type (e.g., the vehicle 100 being used to deliver items or for personal use), and/or other suitable types of triggers. For an object activity, the object need not be detected by the vehicle 100. For example, in a fifth generation cellular network with a vehicle-to-everything (5G V2X) environment, the vehicle 100 can receive first location data from the object (e.g., another vehicle 100) and determine the proximity therebetween by comparing the first location data to its own location data. Based on the proximity (e.g., the distance between them being smaller than a distance threshold and/or the direction to the object being in a particular direction of movement of the vehicle), the vehicle 100 can detect a trigger to change a presentation property. In another example, the processing can be distributed between the vehicle 100 and a cloud service. In this example, the first location data can be sent to the cloud service and the cloud service can relay this location data to the vehicle 100. Then the vehicle 100 can detect the proximity by comparing the first location data to its second location data, and the proximity can be used as a trigger. Additionally or alternatively, the vehicle 100 can send its own location data to the cloud service that then determines the proximity and sends a notification to the vehicle about the proximity. The notification can serve as a trigger to change the presentation property.

Based on the type of the trigger, the presentation property adjuster 114 can determine a second presentation property for the display 120 (or, similarly, a second presentation property to be used in the presentation of image data on the display 120). The second presentation property may be a different sized container on the display 120 or a different setting of the rear-view camera 104. The presentation property adjuster 114 can then cause the image data generated by the rear-view camera 104 to be presented in the container of the display 120 in accordance with the second presentation property. The presentation property adjuster 114 may communicate with the ECU 102 that controls the display 120 to cause the image data to be presented in accordance with the second presentation property.

Figure 2:
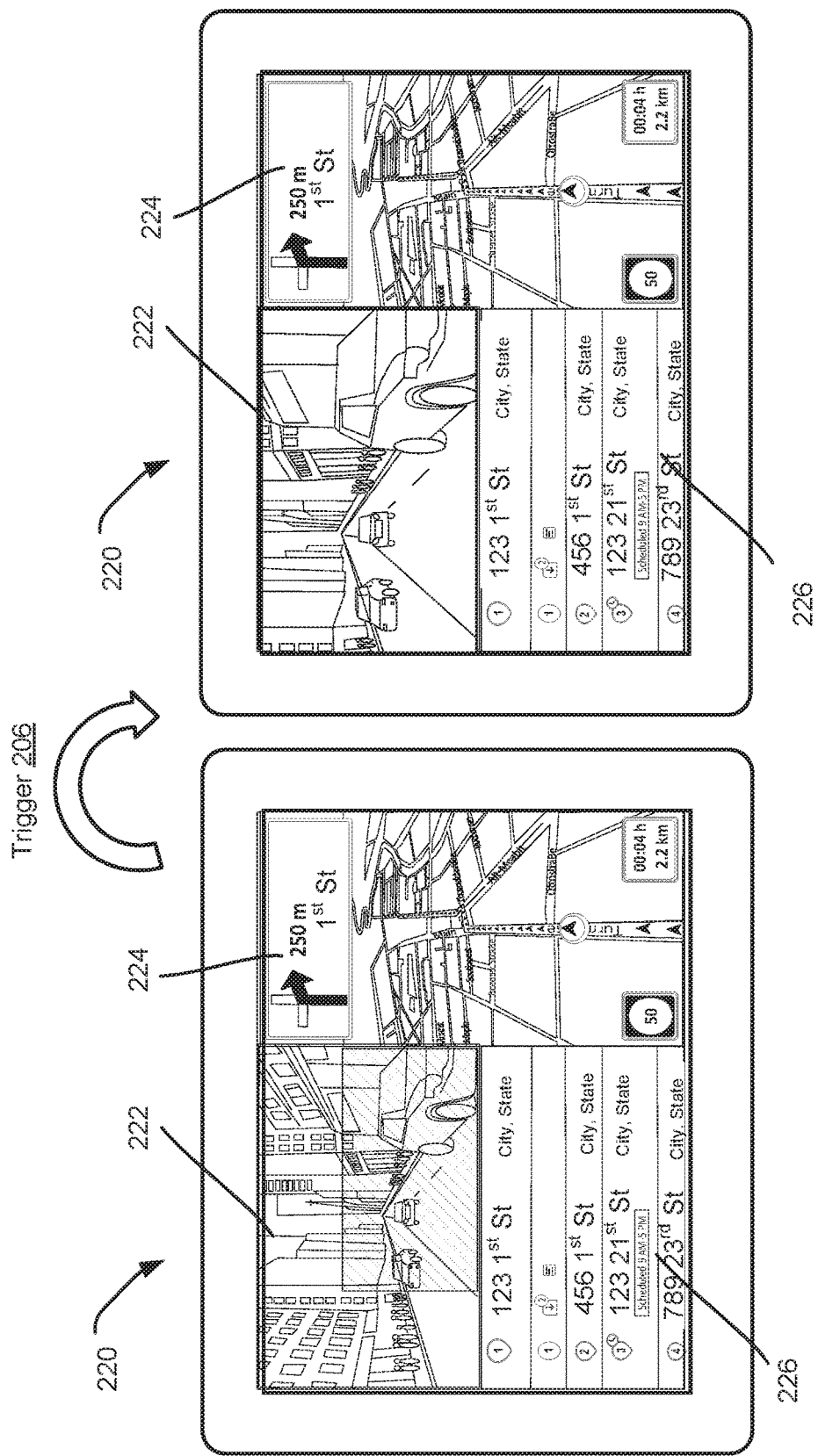
FIG. 2 illustrates an example of changing a camera image presentation in a vehicle based on a trigger, according to embodiments of the present disclosure.

FIG. 2 illustrates an example of changing a camera image presentation in a vehicle based on a trigger 206, according to embodiments of the present disclosure. The vehicle may be the vehicle 100 in FIG. 1 and can include a display 220.). The display 220 provides a user interface to one or more applications (e.g., an infotainment application, a navigation application, a camera application, and the like). The user interface includes a container 222 showing image data generated from a camera of the vehicle. The display 220 also presents navigation data and workflow activity information in other portions of the display 220. For instance, the navigation data can be presented in a second container 224, whereas the workflow activity information can be presented in a third container 226. A control unit (e.g., control unit 110 in FIG. 1) and ECU(s) (e.g., ECUs 102 in FIG. 1) can control the presentations at the display 220. For example, the control unit can control the presentation of the image data in the container 222. A first ECU (e.g., one associated with a vehicle navigation system) can control the presentation of the navigation data the container 224. A second ECU (e.g., one that can be paired with a mobile device of a driver of the vehicle and providing workflow activity information to the driver and/or communicate with a network system (e.g., an online service or a cloud-based service) providing the workflow activity information) can present the workflow activity information the container 226.

In an example, the image data can be presented based on a first presentation property. For instance, the first presentation property can be a setting of the rear-view camera generating the image data that is shown in the container 222. As the vehicle is in operation, the control unit can detect a trigger 206 for changing the first presentation property. Triggers are further described herein below, but can involve any of a user input, a vehicle activity, a workflow activity, environmental conditions, a vehicle use type, and/or other suitable types of triggers. Upon the control unit detecting the trigger 206, the control unit can determine a second presentation property based on the type of the trigger. For instance, the second presentation property may be a different setting of the rear-view camera (e.g., an optical zoom that changes the field-of-view of the rear-view camera or a digital zoom that magnifies image pixels while removing unmagnified image pixels). Generally, triggers can have different types and these types can be pre-associated (e.g., via rules) or associated on the fly (e.g., via the use of a machine learning model) with a presentation property to use, where this presentation property can increase vehicle safety and/or improve the user experience. The control unit can cause the presentation of the image data in the container 222 based on the second presentation property. For instance, the container 222 is illustrated as presenting the image data in accordance with a zoom level change (e.g., a digital zoom change or an optical zoom change) for the rear-view camera, which corresponds to the second presentation property. The second presentation property can additionally or alternatively include a camera tilt change, a camera panning change, a camera brightness change, a camera ISO change, a camera contrast change, a night mode change, etc. based on the type of trigger. In any case, image data generated based on the setting change can be presented at the display 220 in the container 222.

Figure 3:
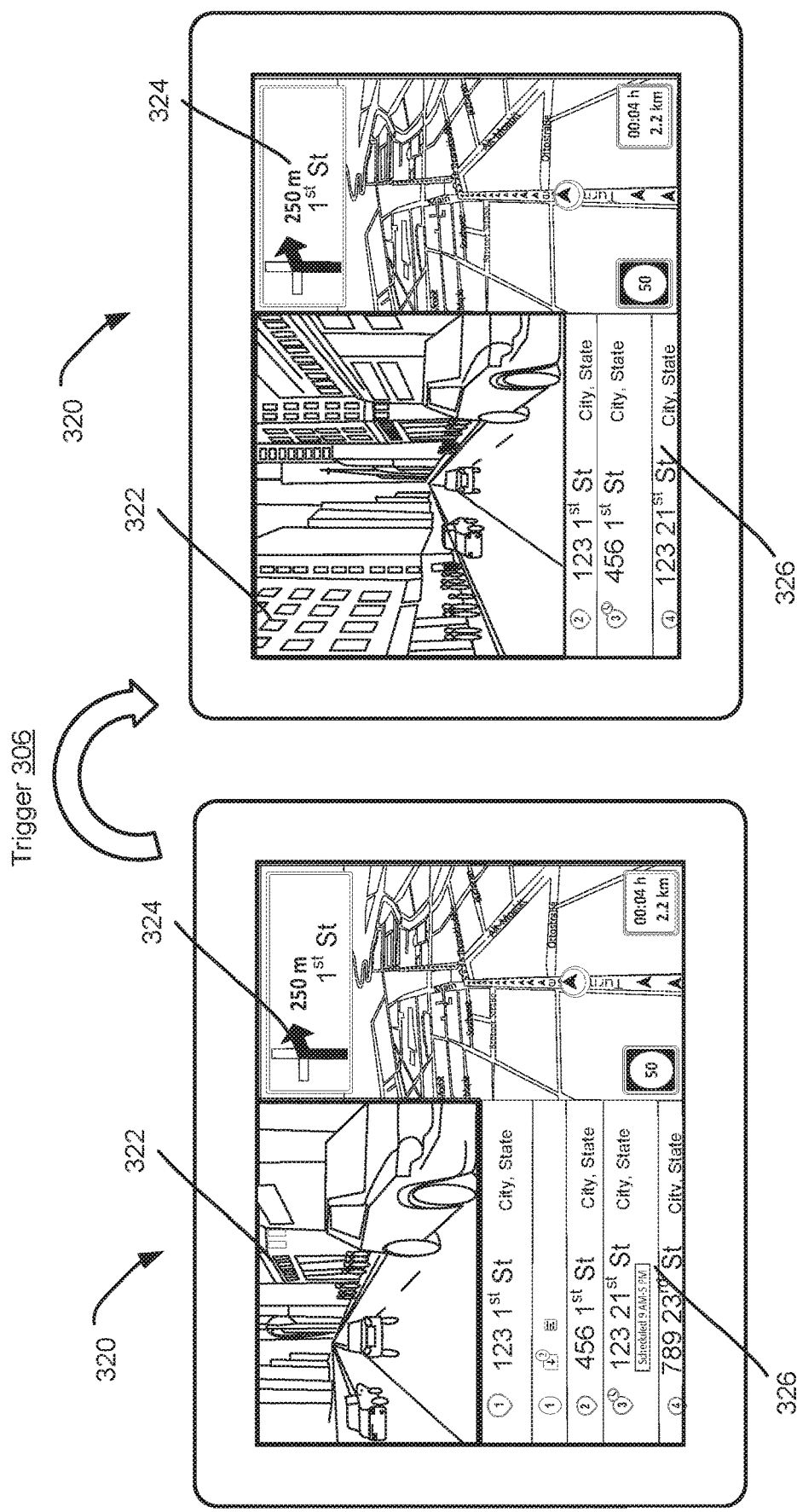
FIG. 3 illustrates another example of changing a camera image presentation in a vehicle based on a trigger, according to embodiments of the present disclosure.

FIG. 3 illustrates another example of changing a camera image presentation in a vehicle based on a trigger 306, according to embodiments of the present disclosure. The vehicle may be the vehicle 100 in FIG. 1 and can include a display 320. The display 320 provides a user interface to one or more applications (e.g., an infotainment application, a navigation application, a camera application, and the like). The user interface includes a container 322 showing image data generated from a camera of the vehicle. The display 320 also presents navigation data and workflow activity information in other portions of the display 320. For instance, the navigation data can be presented in a second container 324, whereas the workflow activity information can be presented in a third container 326. A control unit (e.g., control unit 110 in FIG. 1) and ECU(s) (e.g., ECUs 102 in FIG. 1) can control the presentations at the display 320. For example, the control unit can control the presentation of the image data in the container 322. A first ECU (e.g., one associated with a vehicle navigation system) can control the presentation of the navigation data the container 324. A second ECU (e.g., one that can be paired with a mobile device of a driver of the vehicle and providing workflow activity information to the driver and/or communicate with a network system (e.g., an online service or a cloud-based service) providing the workflow activity information) can present the workflow activity information the container 326.

In an example, the image data can be presented based on a first presentation property. For instance, the first presentation property can be a size of the container 322. As the vehicle is in operation, the control unit can detect a trigger 306 for changing the first presentation property. Triggers are further described herein below, but can involve any of a user input, a vehicle activity, a workflow activity, environmental conditions, a vehicle use type, and/or other suitable types of triggers. Upon the control unit detecting the trigger 306, the control unit can determine a second presentation property based on the type of the trigger. For instance, the second presentation property may be a different size of the container 322. The control unit can cause the presentation of the image data in the container 322 based on the second presentation property. For instance, FIG. 2 illustrates that the size of the container 322 is increased, where the increased size corresponds to the second presentation property. As the size of the container 322 changes, the aspect ratio of the image data can remain the same. Second image data generated by the camera is be presented at the display 320 in the container 322 having the second presentation property. So, the image data can be cropped out and in and image fillers can be used (e.g., a black rectangle under and over the image data).

Figure 4:
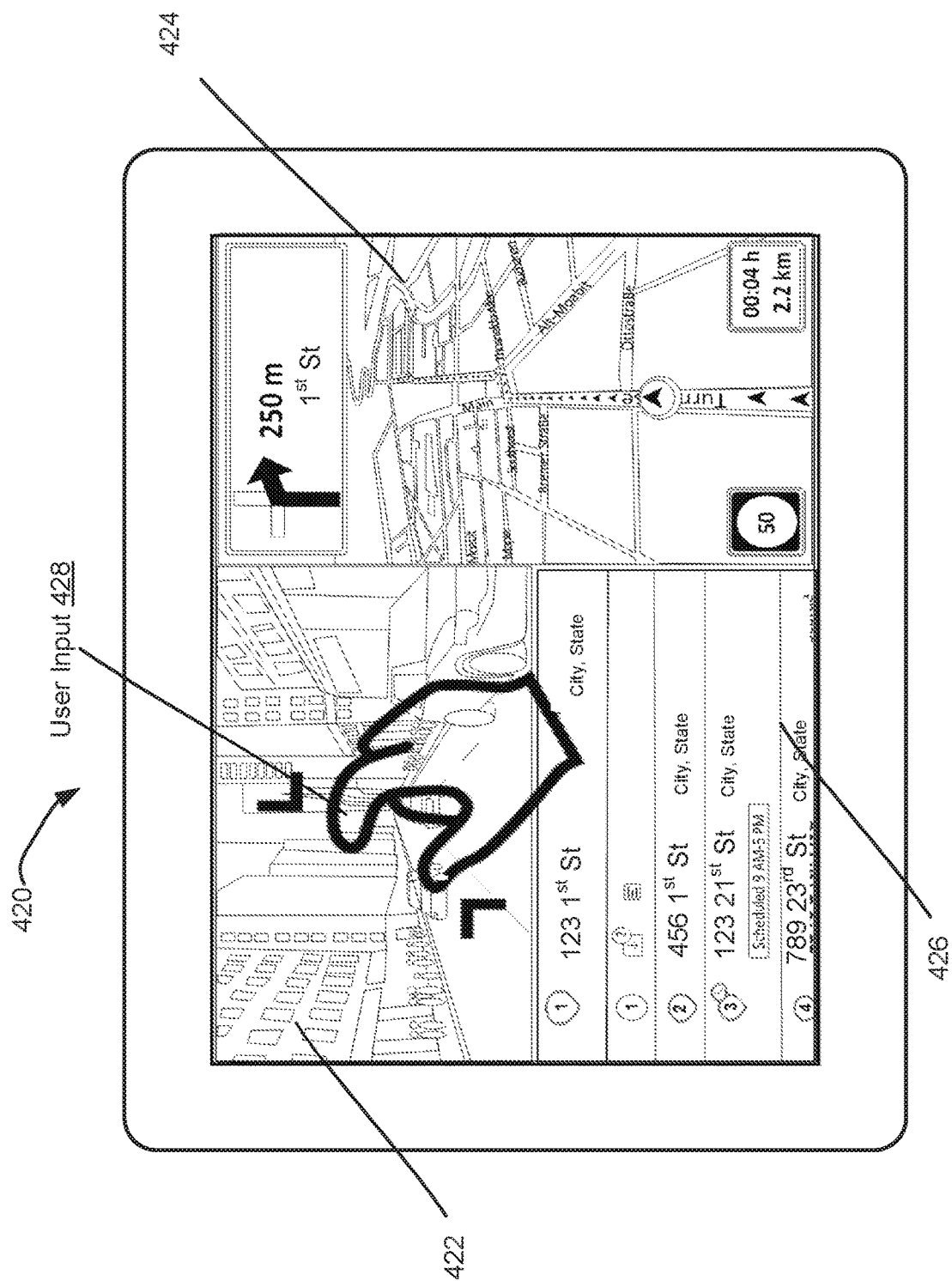
FIG. 4 illustrates an example of a user input trigger for dynamic camera image presentation in a vehicle, according to embodiments of the present disclosure.

FIG. 4 illustrates an example of a user input trigger for dynamic camera image presentation in a vehicle, according to embodiments of the present disclosure. A display 420 provides a user interface to one or more applications (e.g., an infotainment application, a navigation application, a camera application, and the like). The user interface includes a container 422 showing image data generated from a camera of the vehicle. The display 420 also presents navigation data and workflow activity information in other portions of the display 420. For instance, the navigation data can be presented in a second container 424, whereas the workflow activity information can be presented in a third container 426. A control unit (e.g., control unit 110 in FIG. 1) and ECU(s) (e.g., ECUs 102 in FIG. 1) can control the presentations at the display 420. For example, the control unit can control the presentation of the image data in the container 422. A first ECU (e.g., one associated with a vehicle navigation system) can control the presentation of the navigation data the container 424. A second ECU (e.g., one that can be paired with a mobile device of a driver of the vehicle and providing workflow activity information to the driver and/or communicate with a network system (e.g., an online service or a cloud-based service) providing the workflow activity information) can present the workflow activity information the container 426.

A user can provide a user input 426 to the display 420 to initiate a change to a presentation property of the image data. For instance, the user input 426 is illustrated as being a screen pinch manually provided by the user, where the display 420 is a touchscreen display. Other user inputs can involve alternate manual inputs on the display 420 (e.g., double tap on the display 420, a scroll on the display 420, etc.) or via another input device (e.g., a press of a button on a steering wheel or other component of the vehicle), a voice command requesting the change to the presentation property (e.g., where the voice command can be a natural language speech utterance detected by a microphone of the vehicle, where the microphone generates audio data representing this utterance, and where this audio data can be processed locally and/or remotely using natural language processing techniques to detect the voice command and generate output data back to the vehicle system indicating the voice command), or other suitable user inputs. A control unit (e.g., control unit 110 in FIG. 1) can store a pre-association between the user input 426 and a size of the container 422, and/or a setting, such as a zoom level, a camera tilt, a camera panning, a camera brightness, a camera contrast, a camera ISO, a night mode, and/or any other suitable camera setting of the camera. Upon receiving the user input 426, the control unit can determine the setting for the camera and/or the size of the container 422 based on the stored association and present the image data on the display 420 using the setting. Different settings can be predefined as user settings or as user preferences and associated with a user account or a user profile of a driver of the vehicle. For instance, one setting may indicate that the pinching corresponds to a zoom in and/or a level to use for the zoom in, where as another setting may indicate that a double tap corresponds to a zoom out and/or a level of the zoom out. The settings can be constrained for vehicle safety reasons by a set of limits. For instance, the levels of zooming can be constrained to minimum and maximum field of views or to a range of angles (e.g., between one-hundred and one-hundred twenty degrees) for safety reasons. These constraints can also be dynamically changed based on contexts associated with the vehicle, a user account of the vehicle's driver, a workflow that the vehicle is being used for, and the like. For instance, if a vehicle context indicates whether the vehicle is driven on a highway or is located within a city boundary. The zoom level range can depend on the vehicle context. In particular, the highway driving may be associated with a range of angles between eighty-four and on-hundred forty-eight degrees, whereas the city driving may be associated with a range of one-hundred and one-hundred twenty degrees.

As such, the user may be able to customize various user inputs to correspond to various presentation properties. For instance, the user input 426 of pinching the display 420 may be associated with a particular zoom level, but another user input of double-tapping the display 420 may be associated with a different zoom level. So, the control unit can determine which user input is received and present the image data based on the user input and associated zoom level.

In an example, the control unit can constrain changes to the presentation property based on a context (e.g., city, highway, neighborhood, etc.) of the vehicle. For instance, the control unit may receive the user input 426 requesting a change to the setting of the camera. But, depending on the context of the vehicle the change to the setting may be constrained. As an example, if the user provides the user input 426 for the camera to be zoomed, the zoom range may be between one-hundred and one-hundred twenty degrees for the field of view if the vehicle is in the city, but the control unit may constrain the zoom range to be eighty-four to one-hundred forty-eight degrees if the vehicle is on the highway.

Figure 5:
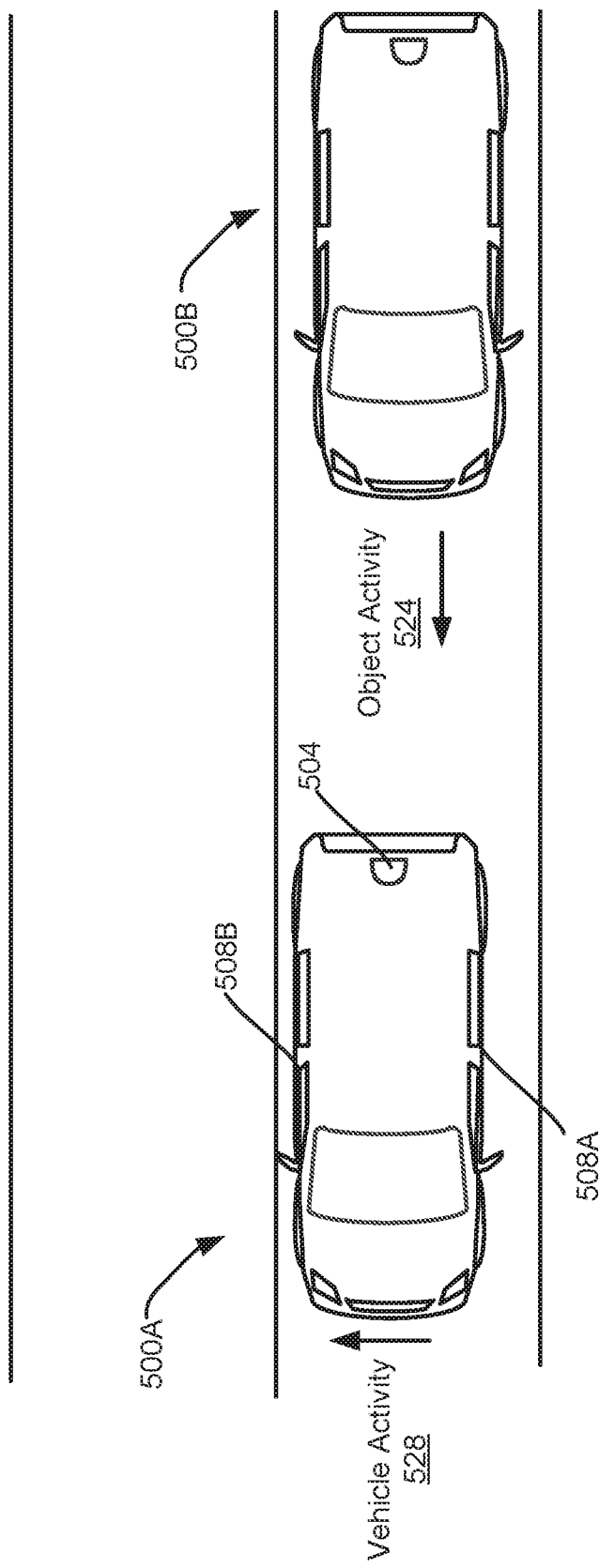
FIG. 5 illustrates an example of a vehicle activity trigger for dynamic camera image presentation in a vehicle, according to embodiments of the present disclosure.

FIG. 5 illustrates an example of a vehicle activity trigger for dynamic camera image presentation in a vehicle 500A, according to embodiments of the present disclosure. A display (e.g., display 120 in FIG. 1) in the vehicle 500A presents image data generated by a camera 504 of the vehicle 500A in a container. The image data is presented based on a presentation property. A control unit (e.g., control unit 110 in FIG. 1) can determine, based on data sent on a CAN bus of the vehicle 500A or sent by an ECU of the vehicle 500A over a different communication bus, a vehicle activity 528. At least a portion of the vehicle activity 528 can be a type of trigger for changing the presentation property to a second presentation property, which is defined for the vehicle activity 528. The vehicle activity 528 is illustrated as a lane change, but the vehicle activity 528 can alternatively include a speed change or a vehicle use (e.g., vehicle in a drive gear, vehicle in a reverse gear, etc.). The control unit may detect the vehicle activity 528 based on a turn signal being activated by a user, data generated by other sensors of the vehicle 500A (light detection and ranging (Lidar) data indicating that a lane is detected and the vehicle approaching and crossing the lane over time), image data generated by the camera 504 and processed to detect the lane change, Lidar data indicating a change to the proximity to other vehicles, and/or location data (e.g., global positioning system (GPS) coordinates or 5G V2X data), etc. The control unit can store associations between different vehicle activities and presentation properties. So, upon detecting the vehicle activity 528 to be a lane change, the control unit can cause the display of the vehicle 500A to present the image data based on the presentation property associated with a lane change. As another example, the control unit may store an association between the drive gear and a presentation property of a first camera view of the camera 504, another association between the reverse gear and a presentation property of a second camera view of the camera 504 or another camera of the vehicle 500A, and yet another association between the vehicle park and a presentation property of a third camera view of the camera 504 or another camera of the vehicle 500A. Upon detecting a change to a gear of the vehicle 500A (e.g., from a first gear to a second gear), the control unit can change the display to present the image data according to the presentation property associated with the second gear rather than the first gear. Note that for safety reasons, the presentation property associated with the reverse gear may be predefined (e.g., based on a regulatory requirement). But, if another display is available, or if another container within the same display is available, the reverse gear can be further associated with a second presentation property. In this case, the gear change to the reverse gear can be a trigger that changes the presentation property of the image data on the other display or container according to the second presentation property as a supplement to the regulatory-predefined presentation property.

Blind spots 508A-B of the vehicle 500A may each be associated with their own presentation property. The control unit can store a first association between blind spot 508A (e.g., on the left hand-side of the vehicle) and a first presentation property and a second association between blind spot 508B (e.g., on the right hand-side of the vehicle) and a second presentation property. For instance, blind spot 508A can be associated with a first view setting of the camera 504 (or a different camera, such as a left hand-side view camera), whereas the blind spot can have 508B can be associated with another view setting (e.g., a different zoom level) of the camera 504 (or a different camera, such as a right hand-side view camera). When the control unit detects the vehicle activity 528 of moving into a right lane, which is associated with the blind spot 508B, the control unit can present the view setting of the camera 504 at the display that is associated with the blind spot 508B. For instance, the presentation property for the blind spot 508A can use a higher zoom in level than that used for the blind spot 508B. Additionally or alternatively, the size of the container presenting the image data can be larger for when the image data corresponds to the blind spot 508A relative to when the image data corresponds to the blind spot 508B.

For a trigger associated with a vehicle activity of a change of speed of the vehicle 500A, the control unit can determine a speed of the vehicle 500A over time (e.g., by receiving such data at a transmission rate from a vehicle speedometer system, such as every one-hundred milliseconds). Based on the control unit detecting a change of the speed, the control unit can determine presentation property changes over time based on the speed, where the determination can be performed at rate corresponding or that is multiple of the transmission rate (e.g., every one-hundred milliseconds or every two-hundred milliseconds). So, the presentation property associated with the output of the camera 504 can be changed gradually over time in accordance with the presentation property changes so that there is no sudden change to the display, which could be a safety hazard for the user. As an example, if an increase in speed is associated with a zooming out of the camera 504, the display can gradually present zoomed out the image data as the speed increases, rather than immediately presenting fully zoomed out image data.

Presentation properties may also be determined for objects detected in the image data. Examples of objects can be other vehicles, pedestrians, animals, or other suitable objects surrounding the vehicle 500A. In FIG. 5, the object can be vehicle 500B, which is a vehicle on a road following the vehicle 500A. The control unit may detect the vehicle 500B, or a proximity of the vehicle 500B to the vehicle 500A, based on image processing of image data generated by the camera 504 or a different camera of the vehicle 500A. The control unit may determine that the vehicle 500B is shown in the image data at a pixel distance from an image reference point. For instance, the image reference point may be a bottom of the container and the control unit can determine that the vehicle 500B is shown twenty pixels above the bottom of the container. If the vehicle 500B performs an object activity 524 (e.g., speeding up or slowing down relative to the speed of the vehicle 500A), there may be a change to the pixel distance. This change can be a trigger for adjusting the presentation property so that the vehicle 500B remains to be shown in the image data at the pixel distance. So, the control unit can determine a zoom level change that will result in the vehicle 500B remaining twenty pixels from the bottom of the container and modify the presentation property to use the zoom level change. Alternatively, rather than maintaining the pixel distance, the control unit may present the vehicle 500B as the same size in the container on the display as the vehicle 500B changes proximity to the vehicle 500A

Figure 6:
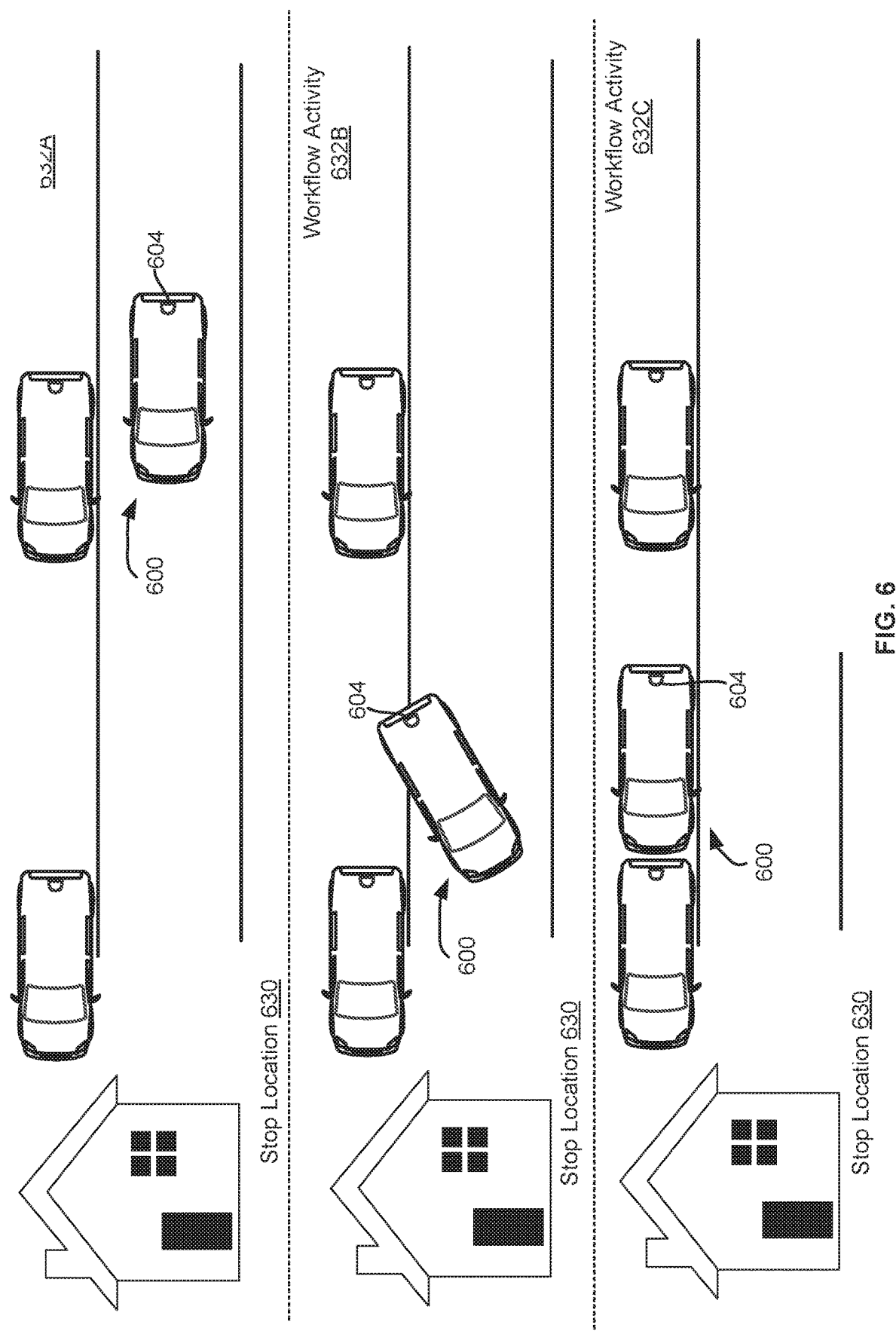
FIG. 6 illustrates examples of workflow activity triggers for dynamic camera image presentation in a vehicle, according to embodiments of the present disclosure.

FIG. 6 illustrates examples of workflow activity triggers for dynamic camera image presentation in a vehicle, according to embodiments of the present disclosure. A display (e.g., display 120 in FIG. 1) in the vehicle 600 presents image data generated by a camera 604 of the vehicle 600. The image data is presented based on a presentation property. A control unit (e.g., control unit 110 in FIG. 1) can determine, based on data from a mobile device of a user of the vehicle 600 that is paired with the control unit or from a remote system that provides an online workflow service to the mobile device and/or the vehicle 600, that the vehicle 600 is being used in support of a workflow. For instance, the workflow can be associated with using the vehicle 600 for item deliveries. Based on additional data received from the mobile device, the remote system, or an ECU of the vehicle 600, the control unit can determine a workflow activity 632 of the workflow. A start or an end of the workflow activity 632 can correspond to a type of trigger for changing the presentation property to a second presentation property, which is defined for at least a portion of the workflow activity 632. The start or end of the workflow activity 632 may be determined based data received from the mobile device or from the remote system, where the data indicates the start or the end. This data can be generated based on user interactions with the mobile device, such as a user checking a box that an item is delivered or based on an application of the mobile device automatically sending data to the control unit indicating the workflow activity 632, where the mobile device can send the data to the vehicle 600 directly. Alternatively, the mobile device may communicate with the remote system, which communicates with the control unit and sends the data thereto. So, the flow of data is indirectly through the remote system rather than directly between the mobile device and the control unit.

As illustrated in FIG. 6, workflow activity 632A corresponds to arriving to a stop location 630 associated with an item delivery, workflow activity 632B corresponds to conducting a parking maneuver associated with the stop location 630, and workflow activity 632C corresponds to the vehicle 600 being parked at the stop location 630. Another workflow activity for the workflow can additionally include departing from the stop location 630. The start or end of the workflow activities 632A-C can be a trigger for changing the presentation property in accordance with defined presentation properties for each trigger. For instance, as the vehicle 600 arrives at the stop location 630 during the workflow activity 632A, the presentation property may be changed to present a zoomed-out field of view of the camera 604 based on a stored association between the workflow activity 632A and the presentation property of the zoomed-out field of view. Then, as the vehicle 600 conducts the parking maneuver at the stop location 630 during the workflow activity 632B, the presentation property may be changed to present image data from a different camera of the vehicle 600 based on a stored association between the workflow activity 632B and the presentation property of the different camera. An additional change can be made to the presentation property upon the control unit determining that the vehicle 600 is parked at the stop location 630 during the workflow activity 632C.

Types of triggers may be based on combinations of workflow activities, vehicle activities, user inputs, environmental conditions, and/or object activities. For instance, an object activity can relate to the control unit detecting an object from image data of the camera 604 or the control unit detecting a proximity change between the object and the vehicle 600. The control unit can store an association between detecting the proximity change of an object and the vehicle 600 while the vehicle 600 is parked (e.g., during the workflow activity 632C) and a presentation property of presenting zoomed-in image data from the camera 604 at the display. As another example, the control unit can store an association between detecting the proximity change of an object and the vehicle 600 while the vehicle 600 is in vehicle reverse and a presentation property of presenting the object in a picture-in-picture at the display. In any case, the presentation property is associated with the type of trigger being a combination of the object activity and workflow activity 632C.

Figure 7:
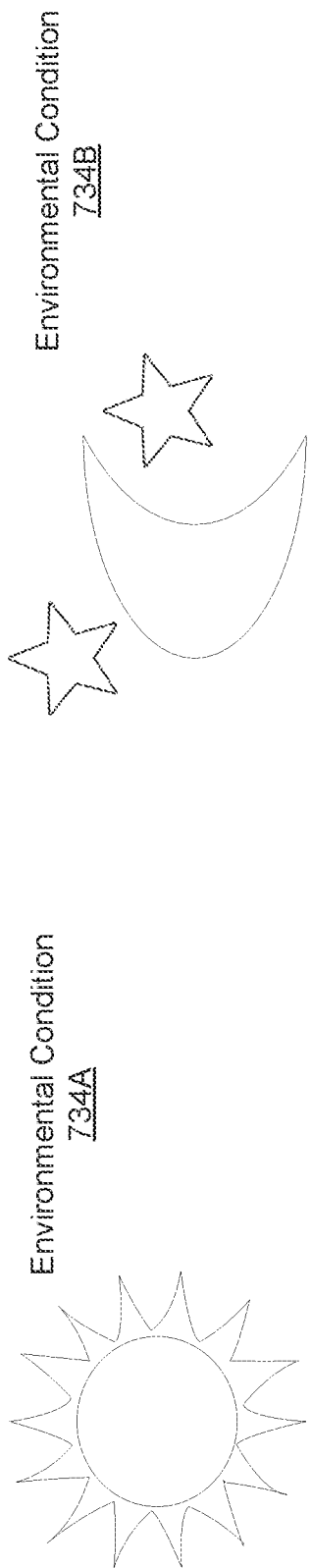
FIG. 7 illustrates an example of an environmental trigger for dynamic camera image presentation in a vehicle, according to embodiments of the present disclosure.
Figure 7:
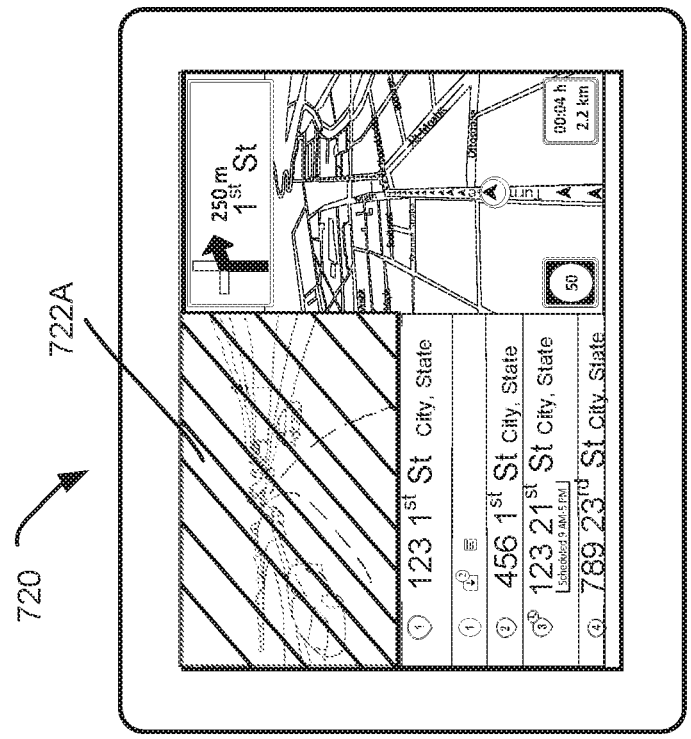

FIG. 7 illustrates an example of an environmental trigger for dynamic camera image presentation in a vehicle, according to embodiments of the present disclosure. A display 720 in the vehicle presents image data generated by a camera of the vehicle in a container 722 of the display 720. A control unit (e.g., control unit 110 in FIG. 1) can store an association between the environmental conditions 734 of a surrounding environment of the vehicle and presentation properties for settings of the camera or the size of the container 722. The environmental conditions 734 may be a time of day, a weather condition, and/or any other suitable environmental condition. The control unit can determine environmental conditions 734 based on weather data, temperature data, and other environmental data received from remote systems or sensors of the vehicle. Upon determining a particular environmental condition is associated with the surrounding environment of the vehicle, the control unit can determine the presentation property based on the stored association and present the image data on the display 720 using the setting. The control unit may optionally adjust a setting of the display 720 and/or a size of the container 722 based on the environmental conditions 734.

As illustrated in FIG. 7, the control unit can determine the environmental condition 734A corresponds to a sunny day, which can be a trigger for presenting the image data at a reduced brightness level. So, the control unit can reduce the brightness setting of the camera and present image data in container 722A on the display 720, based on the environmental condition 734A. In contrast, the control unit can determine the environmental condition 734B corresponds to night time, which can be a trigger for presenting the image data at an increased brightness level. So, the control unit can increase the brightness setting of the camera and present image data in container 722B on the display 720, based on the environmental condition 734B.

Figure 8:
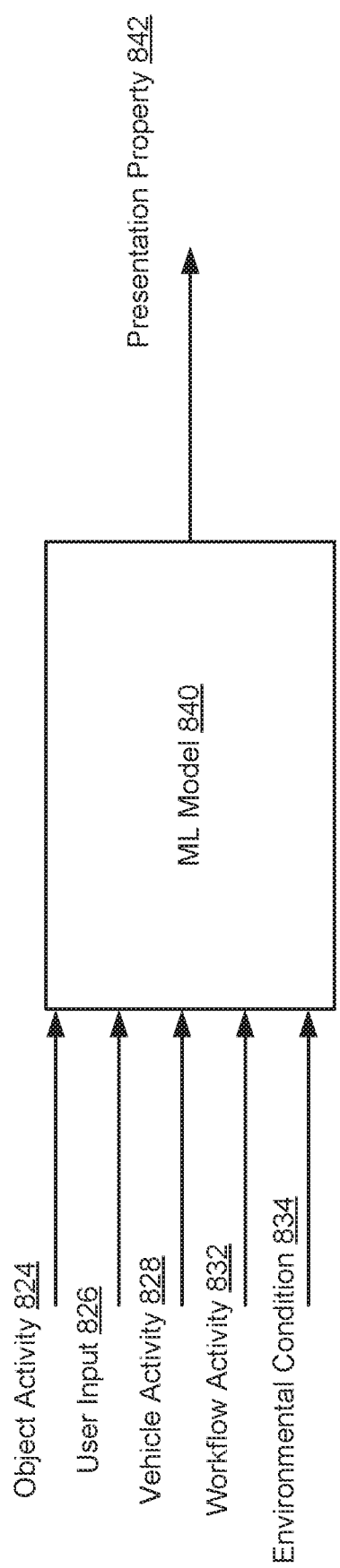
FIG. 8 illustrates a machine-learning model for dynamic camera image presentation in a vehicle, according to embodiments of the present disclosure.

FIG. 8 illustrates a machine-learning (ML) model 840 for dynamic camera image presentation in a vehicle (e.g., vehicle 100 in FIG. 1), according to embodiments of the present disclosure. The ML model 840 can be trained to receive various types of triggers and determine a presentation property 842 for presenting image data at a display (e.g., display 120 in FIG. 1) of the vehicle. Training the ML model 840 can involve the ML model 840 receiving training data of historical triggers and outputting recommended presentation properties until a loss function associated with the ML model 840 is minimized. For instance, the training can be supervised, where for a given set of triggers, an optimum presentation property is defined and labeled for use as ground truth. The ML model is trained to predict, for each set of triggers, a presentation property, and the loss function is computed based on a difference between the predicted presentation property and the ground truth-labeled presentation property for that set of triggers. In particular, the loss function can include a penalty (or, more generally, a cost), where the value of the penalty depends on the difference. In another example, the training can use a teacher-student approach, where a teacher ML trains is initially trained in a supervised or semi-supervised manner and this teach ML trains a student ML to predict presentation properties by minimizing a loss function.

Once trained, the ML model 840 receives an input of one or more of an object activity 824, a user input 826, a vehicle activity 828, a workflow activity 832, and an environmental activity 834 (which may be identified via a separate ML model). The ML model 840 may additionally or alternatively receive an input that includes multiple object activities, user inputs, vehicle activities (e.g., including vehicle use type), workflow activities, or environmental conditions. The ML model 840 then generates the presentation property 842 that is to be used to present the image data based on the input. A control unit (e.g., control unit 110 in FIG. 1) can receive the presentation property 842 and present the image data at the display of the vehicle in accordance with the presentation property.

The use of an ML model is one example of dynamically adjusting the presentation property to use when presenting image data. Other implementations are possible. For instance, rules can be pre-defined and associated with a set of triggers. Depending on a trigger(s), the applicable rule(s) is (are) determined, where the determined rule(s) specifies (y) the presentation property (ies) to use.

As such, some rules for determining a presentation property may be predefined. In such situations, conflicting presentation properties may occur when multiple triggers are detected, where at least two of the triggers can invoke two different rules and these two different rules specific conflicting presentation properties (e.g., a first rule specifying a zoom in, whereas a second rule specifying a zoom out). In this case, a rule hierarchy can be predefined to resolve conflicts. The rule hierarchy can indicate which of the rule(s) should take precedence (e.g., the first rule trumps the second rule, such as the end result is a zoom in rather than a zoom out). Such a rule hierarchy can be defined in light of vehicle safety (e.g., the rule that takes precedence provides the highest possible level of safety among the conflicting rules).

For instance, the control unit can store a first association between a first trigger type (e.g., speeding up) and a first presentation property (e.g., zooming out) and a second association between a second trigger type (e.g., lane change) and a second presentation property (e.g., zooming in). If the vehicle was to both speed up and change lanes simultaneously, the control unit may be conflicted as to whether to zoom in or zoom out the camera. So, the control unit can also store a rule hierarchy of trigger types to resolve the conflict. The rule hierarchy may be based on safety factors for the vehicle. As an example, the rule hierarchy can indicate that the zooming out for a speed increase is ranked higher than zooming in for a lane change. So, if the control unit determines that the vehicle is both speeding up and changing lanes, the control unit can present the image data as zoomed out based on the hierarchy.

Figure 9:
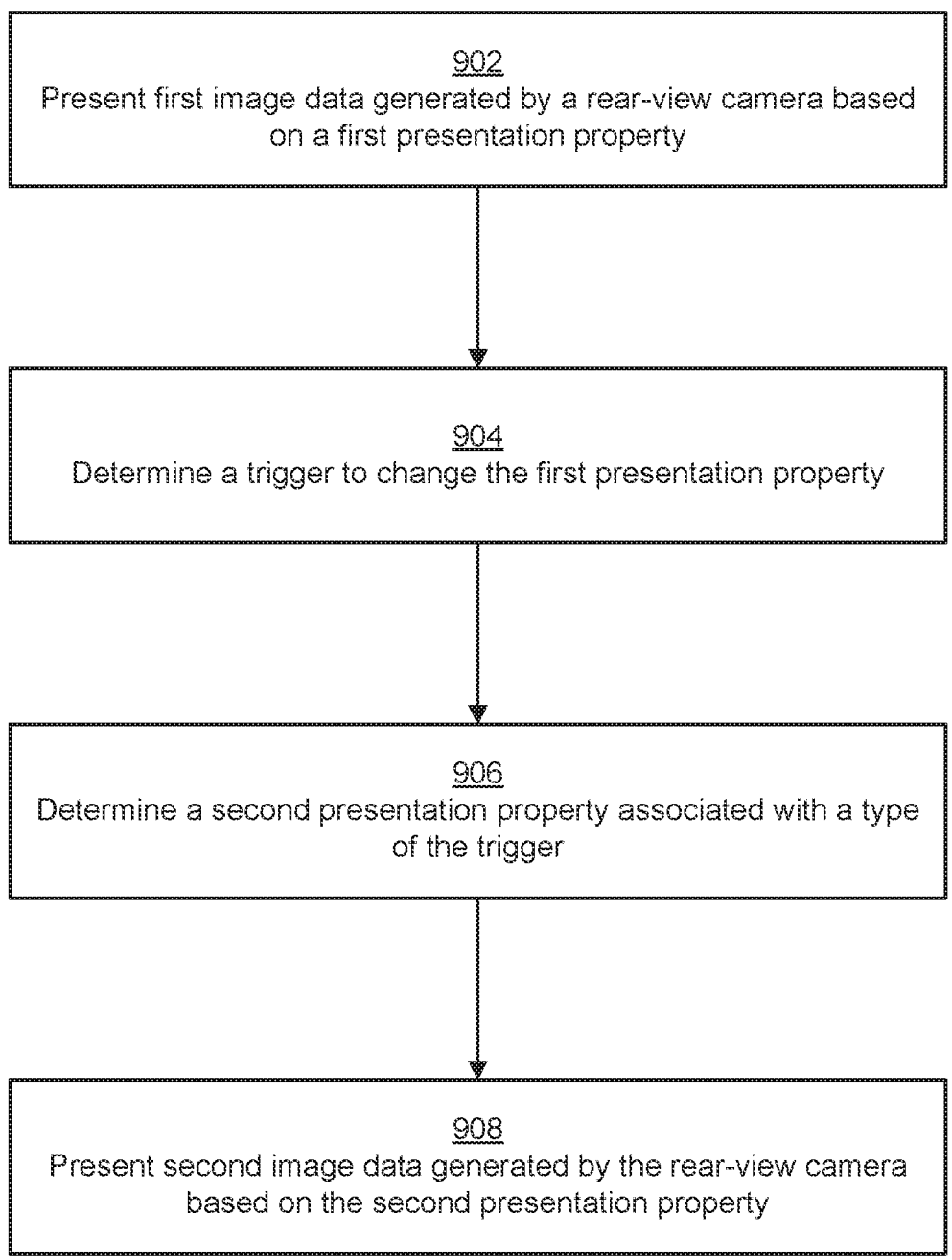
FIG. 9 illustrates an example flow of dynamic camera image presentation in a vehicle, according to embodiments of the present disclosure.

FIG. 9 illustrates an example flow for processes associated with dynamic camera image presentation in a vehicle, according to embodiments of the present disclosure. Operations of the flows can be performed by a computer system, such as the control unit 110. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 902, where the computer system presents first image data generated by a rear-view camera based on a first presentation property. The rear-view camera is installed in a vehicle. The first image data is presented in a container on a display that is installed in the vehicle. The first presentation property uses at least one of a size of the container or a setting of the rear-view camera. For instance, the size of the container may be a default size for the first presentation property or the setting of the rear-view camera may be a default setting of the rear-view camera.

In an example, the flow includes operation 904, where the computer system determines a trigger to change the first presentation property. The trigger may be determined based on image data generated by the rear-view camera, a user input, a vehicle activity, a workflow activity, an object activity, a vehicle use type, and/or an environmental condition detected by sensors or remote systems, as described in FIGS. 4-7.

In an example, the flow includes operation 906, where the computer system determines a second presentation property associated with a type of the trigger. The computer system may store predefined associations between the type of triggers and the second presentation property. Or, an ML model may be used to determine the second presentation property based on the type of the trigger. The second presentation property can use at least one of a different size of the container or a different setting of the rear-view camera.

In an example, the flow includes operation 908, where the computer system presents second image data generated by the rear-view camera based on the second presentation property. The second image data is presented in the container of the display. As the vehicle is continued to be operated, the computer system can determine additional triggers and associated presentation properties. So, the computer system can continually adjust the display based on the triggers.

Figure 10:
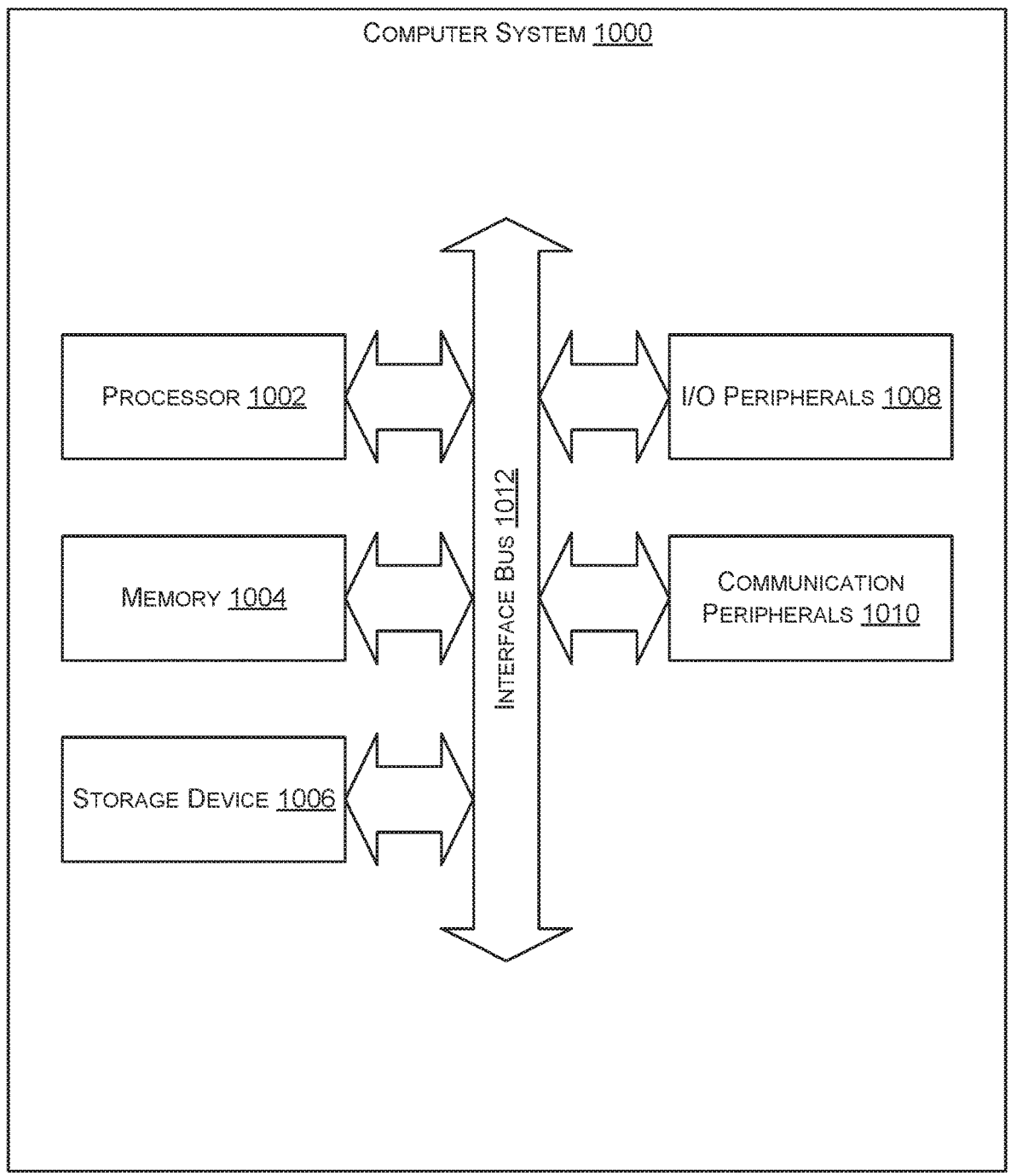
FIG. 10 illustrates example components of a computer system, in accordance with embodiments of the present disclosure.

FIG. 10 illustrates example components of a computer system 1000, in accordance with embodiments of the present disclosure. The computer system 1000 is an example of the control unit 110 of FIG. 1. Although the components of the computer system 1000 are illustrated as belonging to a same computer system 1000, the computer system 1000 can also be distributed (e.g., between a vehicle and a remote system).

The computer system 1000 includes at least a processor 1002, a memory 1004, a storage device 1006, input/output peripherals (I/O) 1008, communication peripherals 1010, and an interface bus 1012. The interface bus 1012 is configured to communicate, transmit, and transfer data, controls, and commands among the various components of the computer system 1000. The memory 1004 and the storage device 1006 include computer-readable storage media, such as RAM; ROM; electrically erasable programmable read-only memory (EEPROM); hard drives; CD-ROMs; optical storage devices; magnetic storage devices; electronic non-volatile computer storage, for example, Flash® memory; and other tangible storage media. Any of such computer readable storage media can be configured to store instructions or program codes embodying aspects of the disclosure. The memory 1004 and the storage device 1006 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 1000.

Further, the memory 1004 includes an operating system, programs, and applications. The processor 1002 is configured to execute the stored instructions and includes, for example, a logical processing unit, a microprocessor, a digital signal processor, and other processors. The memory 1004 and/or the processor 1002 can be virtualized and can be hosted within another computer system of, for example, a cloud network or a data center. The I/O peripherals 1008 include user interfaces, such as a keyboard; screen (e.g., a touch screen); microphone; speaker; other input/output devices; and computing components, such as graphical processing units; serial ports; parallel ports; universal serial buses; and other input/output peripherals. The I/O peripherals 1008 are connected to the processor 1002 through any of the ports coupled to the interface bus 1012. The communication peripherals 1010 are configured to facilitate communication between the computer system 1000 and other systems over a communications network and include, for example, a network interface controller, modem, wireless and wired interface cards, antenna, and other communication peripherals.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A vehicle system comprising:
   a rear-view camera configured for installation in a vehicle;
   a display configured for installation in the vehicle; and
   a computer system configured for installation in the vehicle and comprising one or more processors and one or more memory storing instructions that, upon execution by the one or more processors, configure the computer system to:
   present, in a container on the display, first image data generated by the rear-view camera, the first image data presented based at least in part on a first presentation property that uses at least one of: a size of the container or a setting of the rear-view camera;
   determine a trigger to change the first presentation property;
   determine a second presentation property associated with a type of the trigger, the second presentation property using at least one of: a different size of the container or a different setting of the rear-view camera;
   determine that an object is shown in the first image data at a pixel distance from an image reference point;
   determine a change to the object's position, wherein the type of the trigger corresponds to the change;
   determine a zoom level change such that the object remains to be shown at the same pixel distance from the image reference point, wherein the second presentation property uses at least the zoom level change; and
   present, in the container, second image data generated by the rear-view camera, the second image data presented based at least in part on the second presentation property.

2. The vehicle system of claim 1, wherein:
   the execution of the instructions further configures the computer system to:
   determine, based at least in part on first data from a mobile device of a user of the vehicle or from a remote system, a use of the vehicle in support of a workflow, wherein the workflow is associated with using the vehicle for item deliveries; and
   determine, based at least in part on second data from the mobile device, the remote system, or an electronic control unit (ECU) of the vehicle, a workflow activity of the workflow, wherein the type of the trigger further corresponds to a start or an end of the workflow activity, and wherein the second presentation property is defined for at least a portion of the workflow activity.

3. The vehicle system of claim 1, wherein the execution of the instructions further configures the computer system to:
   determine, based at least in part on first data sent on a controlled area network (CAN) bus of the vehicle or sent by an electronic control unit (ECU) of the vehicle, a vehicle activity, wherein the type of the trigger corresponds to at least a portion of the vehicle activity, and wherein the second presentation property is defined for at least the portion of the vehicle activity.

4. The vehicle system of claim 1, wherein the execution of the instructions further configures the computer system to:
   store a first association between a first user input and a first setting of the rear-view camera and a second association between a second user input and a second setting of the rear-view camera;
   receive user input data requesting a change to the setting of the rear-view camera, wherein the type of the trigger corresponds to the user input data;
   determine that the user input data corresponds to the first user input rather than the second user input; and
   determine the first setting based at least in part on the first association, wherein the second presentation property uses the first setting.

5. The vehicle system of claim 1, wherein the execution of the instructions further configures the computer system to:
   receive data indicating a user input requesting a change to the setting of the rear-view camera, wherein the type of the trigger corresponds to the user input;
   determine a vehicle context of the vehicle; and
   determine a constraint on the change based at least in part on the vehicle context, wherein the second presentation property is based at least in part on the change and the constraint.

6. A computer-implemented method comprising:
   presenting, on a display of a vehicle, first image data generated by a camera of the vehicle, the first image data presented based at least in part on a first presentation property;
   determining a trigger to change the first presentation property;
   determining a second presentation property associated with a type of the trigger;
   determining that an object is shown in the first image data at a pixel distance from an image reference point;
   determining a change to the object's position, wherein the type of the trigger corresponds to the change;
   determining a zoom level change such that the object remains to be shown at the same pixel distance from the image reference point, wherein the second presentation property uses at least the zoom level change; and
   presenting, on the display, second image data generated by the camera, the second image data presented based at least in part on the second presentation property.

7. The computer-implemented method of claim 6, wherein:
   presenting the first image data comprises presenting the first image data in a container of the display, wherein the first presentation property uses at least one of: a size of the container or a setting of a rear-view camera, wherein the camera includes the rear-view camera; and
   presenting the second image data comprises presenting the second image data in the container of the display, wherein the second presentation property uses at least one of: a different size of the container or a different setting of the rear-view camera.

8. The computer-implemented method of claim 6, wherein the type of the trigger is a first trigger type, and wherein the computer-implemented method further comprises:

storing a first association between the first trigger type and the second presentation property and a second association between a second trigger type and a third presentation property;

storing a hierarchy of trigger types;

determining a second trigger to change the first presentation property, wherein the second trigger has the second trigger type; and selecting the first trigger type from the first trigger type and the second trigger type based at least in part on the hierarchy, wherein the second presentation property is determined based at least in part on the first association.

9. The computer-implemented method of claim 6, further comprising:

determining an object activity that comprises at least one of: an object being detected from the first image data or a proximity change between the object and the vehicle; and determining a vehicle activity of the vehicle, wherein the type of the trigger corresponds to the object activity and the vehicle activity, and wherein the second presentation property is associated with the object activity and the vehicle activity.

10. The computer-implemented method of claim 6, further comprising:

determining a workflow activity of a workflow associated with using the vehicle for item deliveries, wherein the workflow activity comprises at least one of: arriving to a stop location associated with an item delivery, conducting a parking maneuver associated with the stop location, the vehicle being parked in association with the item delivery, or departing from the stop location, wherein the type of the trigger corresponds to a start or an end of the workflow activity, and wherein the second presentation property is associated with at least a portion of the workflow activity.

11. The computer-implemented method of claim 6, further comprising:

determining a vehicle activity, wherein the type of the trigger corresponds to at least a portion of the vehicle activity, and wherein the second presentation property is associated with at least the portion of the vehicle activity.

12. The computer-implemented method of claim 6, further comprising:

determining a speed of the vehicle over time, wherein the type of the trigger corresponds to a change of the speed; and determining presentation property changes over time based at least in part on the speed, wherein an output of the camera is presented on the display based at least in part on the presentation property changes.

13. One or more non-transitory computer-readable storage media storing instructions that, upon execution by a system, cause the system to perform operations comprising:

presenting, on a display of a vehicle, first image data generated by a camera of the vehicle, the first image data presented based at least in part on a first presentation property;

determining a trigger to change the first presentation property;

determining a second presentation property associated with a type of the trigger;

determining that an object is shown in the first image data at a pixel distance from an image reference point;

determining a change to the object's position, wherein the type of the trigger corresponds to the change;

determining a zoom level change such that the object remains to be shown at the same pixel distance from the image reference point, wherein the second presentation property uses at least the zoom level change; and presenting, on the display, second image data generated by the camera, the second image data presented based at least in part on the second presentation property.

14. The one or more non-transitory computer-readable storage media of claim 13, wherein the operations further comprise:

storing a first association between a first blind spot of the vehicle and the second presentation property;

storing a second association between a second blind spot of the vehicle and a third presentation property; and determining a vehicle activity associated with the first blind spot, wherein the type of the trigger corresponds to the vehicle activity, wherein the second presentation property is determined based at least in part on the first association.

15. The one or more non-transitory computer-readable storage media of claim 13, wherein the operations further comprise:

storing a first association between a first vehicle activity and the second presentation property;

storing a second association between a second vehicle activity and a third presentation property; and determining that a vehicle activity change to the first vehicle activity, wherein the type of the trigger corresponds to the vehicle activity change, wherein the second presentation property is determined based at least in part on the first association.

16. The one or more non-transitory computer-readable storage media of claim 13, wherein determining the second presentation property comprises determining at least one of a zoom level change, a camera tilt change, a camera panning change, a camera brightness change, a camera ISO change, a camera contrast change, and/or a night mode change based at least in part on the type of the trigger.

17. The one or more non-transitory computer-readable storage media of claim 13, wherein determining a digital zoom change based at least in part on the type of the trigger.

18. The one or more non-transitory computer-readable storage media of claim 13, wherein the operations further comprise:

determining another trigger;

determining, based on the other trigger, that third image data of another camera of the vehicle is to be presented on the display based at least in part on a third presentation property, wherein the third presentation property is associated with the other trigger; and presenting, on the display, the third image data based at least in part on the third presentation property.

19. The one or more non-transitory computer-readable storage media of claim 13, wherein determining the trigger comprises determining at least one of: a voice command requesting a first change to the first presentation property, a second change to a type of use of the vehicle, or an environmental trigger associated with a surrounding environment of the vehicle.

20. The one or more non-transitory computer-readable storage media of claim 13, wherein the operations further comprise:

determining a workflow delivery activity associated with using the vehicle for item deliveries, wherein the type of the trigger corresponds to at least a portion of the workflow delivery activity, and wherein the second presentation property is defined for at least the portion.

* * * * *